United States Patent Office

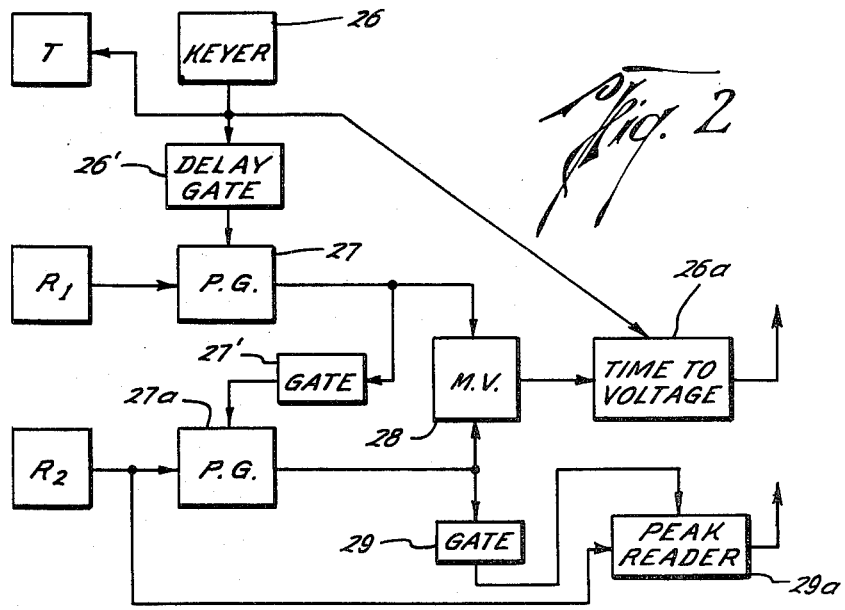
Fig. 2
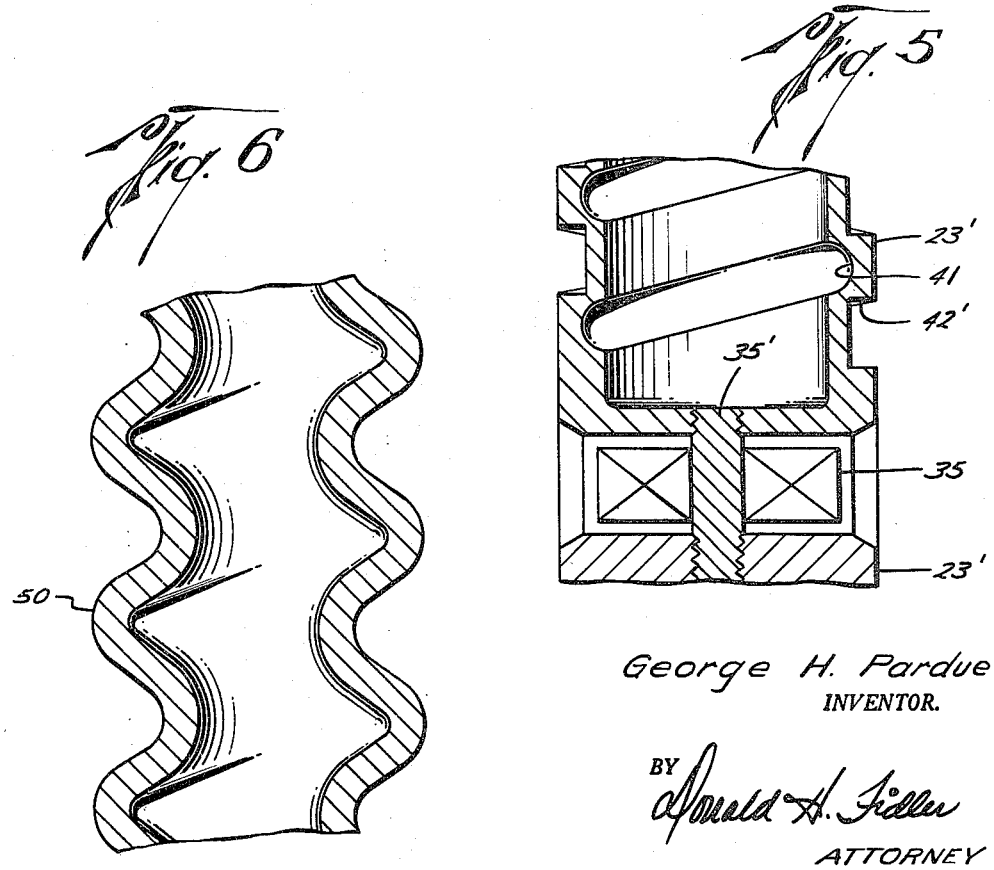
Fig. 6
Fig. 5
George H. Pardue
INVENTOR.
BY Donald H. Fidler
ATTORNEY

3,191,143
Patented June 22, 1965

3,191,143
ACOUSTIC DELAY MEMBER FOR WELL
LOGGING TOOLS
George H. Pardue, Houston, Tex., assignor to Schlumberger Well Surveying Corporation, Houston, Tex., a corporation of Texas
Filed May 16, 1961, Ser. No. 110,470
6 Claims. (Cl. 340—17)

This invention relates to exploratory tools for use in well bores and, more particularly, to acoustic well logging tools which probe the media surrounding a well bore with pulses of acoustic energy.

An acoustic well logging tool is generally cylindrically shaped and suitably sized for passage through a fluid filled well bore. Normally, the tool carries two or more transducers which are disposed and secured at a fixed distance from one another. In a typical acoustic tool having three transducers, one of the transducers serves as a transmitter of sound waves while the remaining transducers serve as receivers of sound waves. The receivers are spaced from one another at a predetermined distance and are disposed to one side of the transmitter along the longitudinal axis of the tool. In operation, the transmitter in the tool is electrically actuated periodically to emit pulses of acoustic energy (or pressure waves) which propagate outwardly from the transmitter with a velocity dependent upon the media traversed by the energy. The arrival of the acoustic energy at the successively positioned receivers is detected to electrical circuits in the tool which function to ascertain a parameter for a given pulse of acoustic energy traveling the predetermined distance between the two receivers.

Acoustic energy as above discussed can be generated or intercepted by either piezoelectric or magnetostrictive transducers in a well known manner.

In a typical well bore, an acoustic tool is commonly spaced from the wall of the well bore so that the emitted acoustic wave energy or pressure pulses are first omnidirectionally transmitted through the fluid (usually mud) in the well bore and, after traveling through the fluid over the distance from the tool to the wall of the well bore, a portion of the traveling wave energy is transmitted to adjacent media surrounding the well bore. The characteristic velocity of wave motion or the wave energy through the fluids in the well is generally in the neighborhood of 5000 feet per second, while the characteristic velocity of wave motion through the adjacent media may vary from 5000 feet per second to 25,000 feet per second depending upon the type of media encountered. Thus, the portion of the acoustic wave energy transmitted into the media generally travels at a higher velocity than the corresponding portion of the wave energy traveling in the well bore fluid. Because of this, the portion of the wave energy traveling through media reaches a receiver prior to the time that the portion of the acoustic wave energy traveling through the fluids does. It is this feature of higher media velocity which permits measurement of the velocity of acoustic energy in the media surrounding a well bore.

Typically, each pulse of acoustic energy upon intercepting a receiver transducer generates an electrical signal containing a number of undulations, cycles or vibrations. The parameter measurement is generally based upon the detection of a given portion or characteristic of an electrical signal developed at the respective receivers for a given traveling pulse of acoustic energy. A commonly used characteristic of a corresponding electrical signal for detecting purposes, for example, is a voltage amplitude value. This is made possible because the undulations, cycles or vibrations of a typical electrical signal as developed from a typical pulse of acoustic energy generally include, in the first cycle, a first peak of a given polarity followed by a second peak of an opposite polarity and approximately three times the magnitude of the first peak and, in the second cycle, a third peak with a polarity similar to the first peak and about ten times the magnitude of the first peak. Hence, when a selected characteristic voltage amplitude value is exceeded, a detection signal for operating the electrical circuits can be developed. The characteristic voltage amplitude value selected for detection purposes is generally such that detection will occur during the first cycle of a signal. The selection of a voltage amplitude characteristic of a first cycle of the signal to detect the first arrival of the acoustic signal is desirable because the voltage amplitude values of subsequent cycles are generally distorted because of acoustic reflections in the borehole.

From the foregoing discussion concerning the nature of acoustic wave propagation in a well bore and timing of such propagation over a fixed interval, it is apparent that a suitable supporting means for the transducers must be incapable of passing detectable acoustic energy longitudinally between the transducers at a velocity higher than that of the adjacent media surrounding the well bore. Obviously, if the supporting means are not so constructed, the receiver circuit would be triggered prematurely by the acoustic energy traveling through the support means thereby to prevent the electrical circuit from obtaining a parameter measurement accurately related to the velocity of the adjacent media.

Heretofore, the housing or support means provided for supporting and spacing the transducers from one another have had low strength characteristics and either (1) a low velocity characteristic, or (2) the support means have had an attenuating characteristic to suppress the amplitude of the energy. In other words, the support means heretofore have acoustically inhibited detectable acoustic energy from triggering the transducer prior to the earliest arrival of the acoustic energy traveling through earth formations. However, to meet these acoustical inhibiting conditions for acoustically blocking the direct sound path, the support means have been complex and expensive to manufacture and have been expensive to maintain and have been lacking in strength qualities for repeated, general field use.

Accordingly, it is an object of the present invention to provide new and improved acoustic logging tools wherein the support has high strength qualities as well as an acoustical inhibition characteristic relative to the transmission of detectable acoustic energy lengthwise of the support between transducers.

A further object of the present invention is to provide new and improved acoustic logging tools having a relatively high strength and stiffness to withstand the shocks and forces inherently encountered in a logging operation.

Another object of the present invention is to provide acoustic logging tools with a support strong in tension to facilitate a fishing or retrieving operation if the tool should become temporarily immovable in the well bore.

Still another object of the present invention is to provide new and improved acoustic logging tools having a high strength, unitary and integral support constructed and arranged for artificially increasing the normal time interval for an acoustic pulse to pass therethrough.

A still further object of the present invention is to provide a new and improved support for acoustic logging tools which is constructed of metal with a configuration such that the support has a lower velocity characteristic than normally would be expected.

Yet another object of the present invention is to provide a new and improved support for acoustic logging tools in accordance with the foregoing objects which is relatively inexpensive to manufacture and is durable and reliable in field operations.

Apparatus in accordance with the present invention includes an elongated, relatively stiff, high-strength metallic tubular member for carrying at least two acoustic transducers in a spaced apart relation. The generally tubular configuration of the member is characterized by recesses arranged in the inner and outer walls of the tubular member and along its length. The pattern arrangement is such that the recesses overlap one another to provide a substantially longer acoustic path in distance than the straight line distance along a generatrix between such successive pairs of points.

The novel features of the present invention are set forth with particularity in the appended claims. The present invention, both as to its organization and manner of operation, together with further objects and advantages thereof, may best be understood by way of illustration and example of certain embodiments when taken in conjunction with the accompanying drawings in which:

FIG. 2 is an electrical schematic diagram of an operating system for the acoustic logging tool, shown in FIG. 1;

FIG. 3 is an enlarged view in longitudinal cross-section taken along line 3—3 of FIG. 1;

FIG. 4 is a view in cross-section taken along line 4—4 of FIG. 3;

FIG. 5 is a view of a portion of a tool embodying still another configuration of the present invention and another way of mounting a transducer on a tool; and FIG. 6 is a view of a section of a tool embodying another configuration of the present invention.

Figure 1:
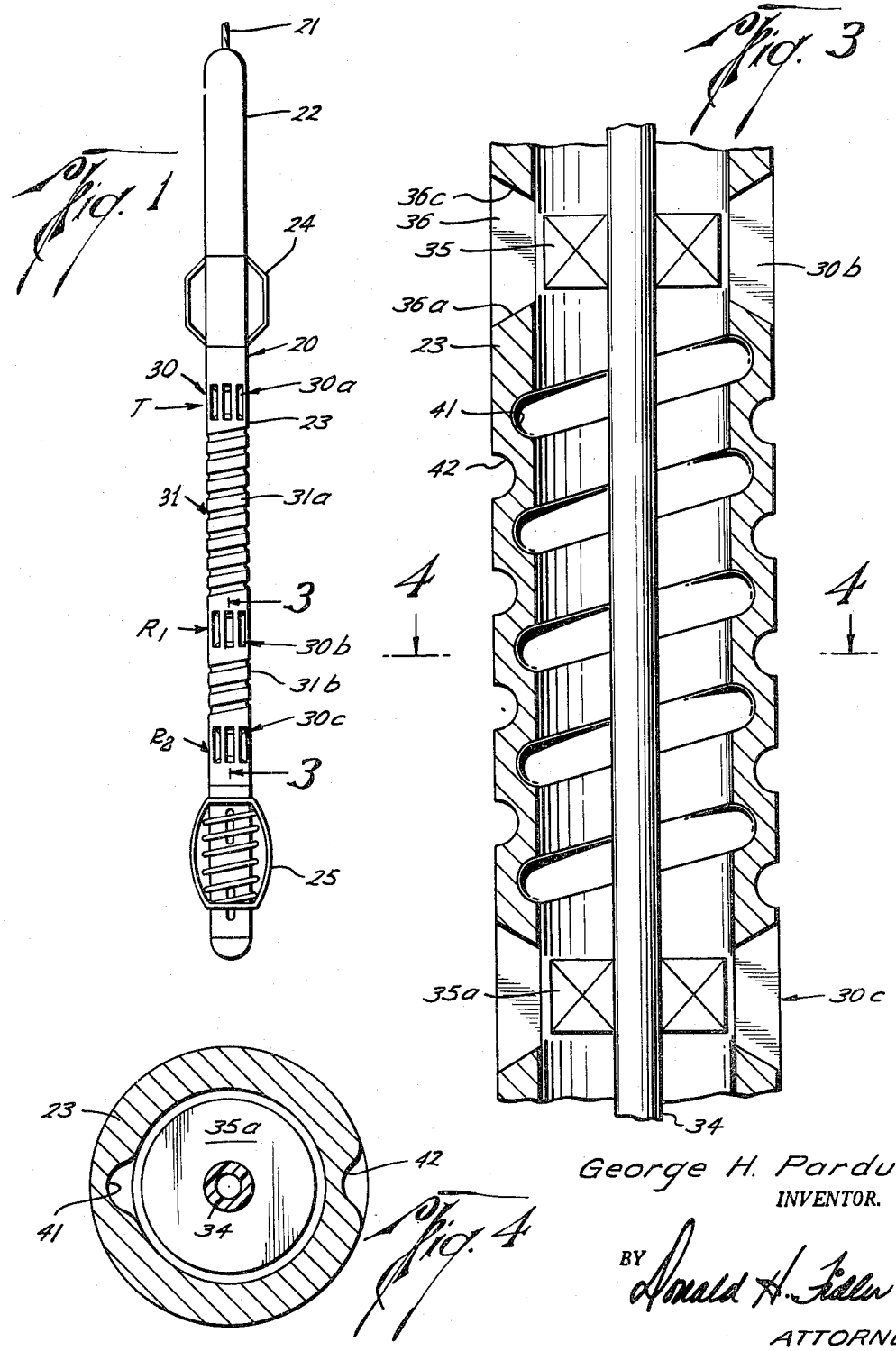
FIG. 1 is a view of an acoustic logging tool embodying the present invention.

In the description to follow, it should be understood that the term "acoustic energy" refers primarily to compressional wave energy although it is not intended to exclude acoustic energy such as shear wave energy, etc. Likewise the term "characteristic velocity" as hereinafter used means the velocity value normally obtained when a pulse of acoustic energy traverses a solid, uninterrupted material object in a straight line path between two fixed points in a given time. The terms "detectable" energy or "detectable" acoustic energy as used hereinafter means acoustic energy having a characteristic which is capable of energizing a transducer such that a detecting circuit is responsive to the electrical signal generated in response to the characteristic of the acoustic energy. "Apparent velocity," as hereinafter used, means an apparent velocity value normally obtained when a pulse of detectable acoustic energy traverses a material object, constructed and arranged in accordance with the present invention, between two fixed points lengthwise fo the object over a time interval other than would be normally expected for the object in its solid configuration. The term "acoustic path" as hereinafter used means solid, substantially continuously connected material providing a medium through which acoustic wave motion may be transmitted.

The present invention is concerned with an acoustic logging tool having an elongated, tubular support constructed of steel for strength and ruggedness. Since the characteristic velocity of acoustic energy in steel is in the neighborhood of 17,000 feet per second and the range of characteristic velocities of the media desired to be investigated is from 5,000 to 25,000 feet per second, it will be appreciated why a steel support or housing has heretofore been considered unusable.

Considering first the fact that the characteristic velocity, distance, and time factors are related by the classical expression $S=vt$ so that from any two given values, the third may be reliably calculated, it will be appreciated that for a fixed length of housing, the time factor is inversely related to the velocity factor. Therefore, it would appear that acoustic energy traveling over a fixed length of steel housing which has a characteristic velocity of 17,000 feet per second, would invariably travel over the fixed distance in a fixed time. However, by means of the present invention, the construction of the steel housing can be arranged so that detectable energy travels over a fixed length of housing with an apparent velocity which is considerably less than 17,000 feet per second and in a time interval which is greater than the aforesaid fixed time.

In accordance with the present invention, prime conditions for reducing the characteristic velocity of a length of a tubular support constructed of steel are to substantially eliminate any direct linear path longitudinally of the tubular support and to provide an acoustic interference pattern lengthwise of the housing. Stated another way, the linear continuity of the tubular support in its lengthwise direction is substantially interrupted or disrupted, and by so doing, tortuous acoustic paths are formed. However, the interruption is such that there are remaining longitudinal interconnecting ties which prevent substantial longitudinal flexing of the tubular member. This effectively lengthens the path that acoustic energy must follow and also affects the mechanical characteristics of a support by decreasing the longitudinal unit spring rate of the support and the weight per unit length.

The present invention provides an integral tubular member or support with a moderately high velocity characteristic, i.e., 10,000 to 12,500 feet per second, obtained by recesses in the member arranged to provide a relatively high spring rate and substantial interference in an acoustic path lengthwise of the tubular member to attenuate the acoustic energy.

As will now be explained, a derived relationship between the unit spring rate and weight per unit length can give a fair approximation of the "apparent velocity" of a tubular member constructed and arranged in accordance with the present invention wherein the "apparent velocity" is substantially independent of a specific configuration of the tubular member.

From basic physics, it is known that the velocity V in elongated bars and tubes is equal to $$V=\sqrt{\frac{E}{\rho}} \qquad (1)$$

where E is Young's modulus of elasticity and $\rho$ is the mass density. It is also known that the weight density $d$ is equal to $$d=\rho g \qquad (2)$$

where $g$ is the gravitational constant of 32.2 pounds per sec.$^2$. Young's modulus of elasticity E is, of course, equal to $$E=\frac{Pl}{A(\Delta l)} \qquad (3)$$

where P is a force in pounds; $l$ is a length in inches; A is a cross-sectional area in square inches; and $\Delta l$ is a change in length in inches.

Substituting Equations 2 and 3 into Equation 1 and adjusting the units into inches and pounds gives the following equation for velocity $$V=\sqrt{P\frac{(l)}{(\Delta l)}\frac{(l)}{(W)}\frac{(g)}{(12)}} \qquad (4)$$

Equation 4 can be rearranged as follows:

$$V=\sqrt{\frac{\frac{g}{(12)}\frac{(P)}{(\Delta l/l)}}{W/l}}=1.639\sqrt{\frac{s}{w}} \qquad (5)$$

where V is velocity in feet per second and where S is the unit spring rate in pounds/in./in., W equals the weight in pounds, and $w$ equals the weight per unit length in pounds/in.

The above derived relationship is considered applicable for deriving an approximate apparent velocity value for a tubular member with void spaces arranged about its periphery and along its length in such a manner that a substantially non-linear or interrupted acoustic path is provided lengthwise of the housing. The apparent velocity derived from the use of this formula is also understood to be the limiting value of velocity which would be obtained as the frequency of the acoustic energy approaches zero.

The precise theoretical effect of frequency of the pulse of energy relative to the above derived relationship has not been exactly determined. However, the following effects have been observed. A predominant frequency value for a pulse of energy from a given transmitter can be shown to be the resonant frequency of the transmitter and can be easily determined by measurement of the time period of a cycle. It should be appreciated that a pulse of energy from a transmitter is generally made up of a multitude of frequencies above and below that of the predominant frequency. The intensity of the frequency components is generally a maximum at the predominant frequency and decreases for frequencies above and below the predominant frequency.

The ability of a tubular member to pass sound will depend upon the following:

(1) Acoustic path length
(2) Attenuation tendency or inhibition characteristic
(3) Spring rate and mass per unit length.

Disregarding pass bands and other frequency sensitive phenomena, it can be generally stated that the maximum velocity will be determined by the interconnected path length. For a given path width, sound frequencies with a quarter-wave length less than the path width are permitted to pass with relatively low resistance. As the frequency is decreased, the quarter-wave length is increased and the resistance to passage increased, causing a reduction in signal intensity. This is accompanied also by a decrease in the speed of transmission. As the frequency continues to decrease, the resistance to passage increases and the speed of propagation decreases until the limiting value based on the unit spring rate and mass per unit length is reached. From this it can be seen that the apparent detectable velocity will fall somewhere between the values obtained by unit spring rate-mass determination and by a determination of the length of the acoustic path, depending upon the frequency distribution of the acoustic pulse. As would be expected, with a steel tubular member constructed and arranged to have a given apparent velocity calculated by means of the previously derived relationship, a pulse of energy with, for example, a predominant frequency of 30 kc. generally travels through the housing with an actual apparent velocity which is higher than a calculated apparent velocity derived from the unit spring rate and weight per unit length.

Turning now to specific illustrations of the present invention, it should be understood that the present invention involves an elongated and generally cylindrical well tool which is to be used in a well bore containing a well fluid. The tool is adapted to be passed through the well bore by means of an armored electrical cable spooled on a surface-located winch and is electrically coupled to surface indicating and recording units.

In FIG. 1 there is illustrated an elongated but rigidly constructed acoustic logging tool 20 adapted for passage in the above described customary manner through a well bore (not shown) by means of an armored electrical cable 21 and winch (not shown) which is situated at the earth's surface. The tool 20 includes an upper, tubular cartridge or housing 22 and a lower, tubular housing 23, both of which are preferably constructed of steel. A single centralizer support device 24 disposed at the center of gravity of the tool 20 may be employed if the tool is to be centered in a well bore. Alternatively, two or more centralized supports disposed along the length of the tool may be employed if so desired. Instead of a centralizer or centralizers the tool may employ stand-off devices to space the tool only a short distance away from the wall of the well bore. Also, if desired, a caliper device 25 for measuring the diameter of the well bore may be coupled to the tool 20, for example, at its lower end as shown in the drawing.

Within the upper cartridge 22 are electronic components and circuits to periodically actuate the transmitter T and to perform the measuring function in response to signals from the receivers $R_1$ and $R_2$. The electronic circuits are coupled via cable 21 to conventional surface indicating and recorder instruments (not shown). Briefly, the measuring function may be accomplished by circuits as shown in FIG. 2 wherein a keying circuit 26 periodically triggers the transmitter T to emit a pulse of acoustic energy. The keying circuit also conditions a pulse generator 27 for operation after a predetermined time interval which is fixed by a delay gate 26'. The predetermined time interval is, of course less than the time required for an emitted pulse of acoustic energy to reach the receiver $R_1$. The keying circuit also provides a reset pulse to reset a time to voltage circuit 26a. At the time the first receiver $R_1$ senses the acoustic energy emitted by the transmitter T, a characteristic of the electrical signal developed by the receiver $R_1$ is used to trigger the pulse generator 27 to produce an output pulse. The output pulse of generator 27 triggers a multivibrator 28 into operation and also operatively conditions a pulse generator 27a for operation by means of a gate circuit 27". Thereafter the acoustic pulse arriving at receiver $R_2$ similarly triggers the pulse generator 27a to produce an output pulse which triggers the multivibrator 28 into an inoperative condition. The time interval $\Delta t$ between the output pulses of the pulse generators 27 and 27a is converted by a time to voltage circuit 26a into a voltage signal for transmission to the surface instruments via the cable 21.

In addition to the foregoing time parameter, the amplitude of the signal can be measured. In this case, the output pulse of pulse generator 27a triggers a timing gate 29 which gates a peak reader circuit 29a on for a given time duration for measuring the amplitude of a signal generated by the receiver $R_2$. The peak reader circuit 29a provides a voltage output representative of the measured amplitude of the signal from receiver $R_2$. For greater details concerning such an amplitude measuring device, reference may be made to the co-pending application of L. H. Gollwitzer, Serial No. 831,328, filed August 3, 1959 and assigned to the assignee of the present invention.

The lower, tubular housing 23 includes three illustrative and similarly formed transducer sections identified by the number 30 and differentiated from one another by the letters $a$, $b$ and $c$. Transducer sections 30 may be separated from one another by identically formed acoustic inhibiting sections identified by the number 31 and differentiated from one another by the letters $a$ and $b$. In general, each transducer section 30 is constructed and arranged to permit and to facilitate the travel of acoustic energy in a generally radial pattern between a transducer within the tubular housing and the fluids or muds (not shown) in the well bore which are exterior of the tubular housing. Also, in general, each acoustic inhibiting section 31 is constructed and arranged so as to increase the apparent time required for detectable energy to travel over the portions of the housing between transducer sections 30.

As schematically shown in FIG. 3, exemplary magnetostrictive transducers 35 and 35a can be secured in any convenient manner to a tubular support rod 34 having a low velocity characteristic. For example, rod 34 can be constructed of "Teflon," which has a characteristic velocity of 4400 feet per second. While not shown, the electrical conductors for the exemplary transducers 35 and 35a may be passed through openings (not shown) in rod 34 to the electronic cartridge housing 22. Transducers 35 and 35a are conventional in the art and need not be further described. The support rod 34 can be connected (not shown) in any suitable and convenient manner relative to the lower housing 23 so that the transducers 35 and 35a are disposed in a generally central position relative to the cross section of the lower housing 23 and generally in a central position relative to the length of a transducer section 30. Alternatively, the transducers could be directly attached to the interior of the housing in any suitable manner if so desired.

A transducer section 30 generally includes a plurality of openings 36 in the housing 23, which are generally rectangularly shaped lengthwise of the housing and are equidistantly spaced from one another about the periphery of the housing. The width of an opening 36 is defined between parallel and longitudinally extending side surfaces is generally equal to the width of the sections or portions of housing disposed between adjacent openings 36. The length of an opening 36 is defined between upper and lower inside end surfaces 36c, 36d, which slope inwardly towards one another from the outer surface of the housing 23 to its inner surface. The length of the openings 36 generally should be equal to or greater than the longitudinal dimension of a transducer 35 within the housing. Since a typical magnetostrictive transducer has an appreciable longitudinal dimension (2″ to 3″ in a typical instrument) the openings 36 are illustrated as elongated in a direction lengthwise of the housing. The sections of the housing between the openings 36 provide excellent stress bearing qualities. Preferably, there are from 8 to 12 such openings 36 spaced about the periphery of the housing for a magnetostrictive transducer which emits primarily radial pressure waves. This range of openings has been found to provide an efficiency of transmission of sound radially from or into the housing, which ranges from 98% to virtually 100%.

Each acoustic inhibiting section 31 is constructed and arranged to provide recesses in the inner and outer walls of the housing which are disposed along the length of the housing 23 and provide undulations along its length or a generally tortuous configuration for the housing. Hence, acoustic wave transmission lengthwise of the housing occurs by traveling tortuous paths which extend between successive points spaced along a generatrix of the lower housing 23 and which are greater than the straight line distance between a successive pair of points.

The invention as illustrated in FIGS. 3 and 4 involves the steel tubular housing 23 in which inner and outer spiralling U shaped grooves 41 and 42 have been cut. Each of the grooves spirals in a similar manner and has the same pitch. The grooves 41 and 42 are, however, displaced at 180° relative to one another (note view from a horizontal cross-section as in FIG. 4). The depth of the grooves 41 and 42 is such that the lowest portion of each groove extends beyond a mid-point between the inner and outer walls of the housing 23. In this manner, a linear path lengthwise of the housing is interrupted. The spacing between the inner and outer grooves lengthwise of the housing is made less than one quarter wave length of the principal frequency of the acoustic energy. The pitch of the grooves is made such that energy traveling in a helical path through the solid portion separating the grooves will be delayed by the extra path length created.

More specifically, in explanation of the above described arrangement, there are two primary paths of sound transmission which may exist. Considering a first path as the continuous helical strip of the housing it will be appreciated that an acoustic impulse will travel along this helical strip at the velocity of sound in steel. The time required for an acoustic impulse to travel such a helical path is dependent upon the helix angle of the strip. To calculate an appropriate helix angle the following example is provided: let $t_1$ be equal to the time required for an acoustic impulse to travel a length $h$ along the helix at a velocity $c$ where $c$ is equal to the characteristic velocity of steel. Let $t_2$ be equal to the time required for an acoustic impulse to travel a distance $l$ through the adjacent media in a generally vertical direction with a velocity of $c_2$ where $c_2$ is equal to the minimum significant media velocity to be considered. If the times $t_1$ and $t_2$ are set equal to one another, then the cosine of the angle $\phi$, where $\phi$ is the helix angle, is equal to the minimum media velocity $c_2$ divided by the velocity of steel $c$. Using the values of 5000 feet per second as a lowest media velocity to be considered and 17,000 feet per second as the velocity of steel, the helix angle $\phi$ is calculated to be about 72°.

A second path of sound transmission would be along the length of the housing parallel to the central axis of the housing. In this instance, the grooves serve to break up the straight line path lengthwise of the housing and, at low frequencies of acoustic impulses, the apparent velocity can be calculated from the Formula 5. For high frequency acoutic impulses, the transmission effects are minimized by keeping the sections of the housing wall between the grooves small with respect to the wave length of the acoustic impulses.

Example No. 1 (FIG. 3)

A sample metal tube was constructed having a pattern as shown in FIG. 3 and a helical angle of approximately 72° as described above.

To calculate the velocity, the following parameters were employed:

Pipe size: 3.62″ O.D. x 2.77″ I.D.
Material: Steel—AISI—4130
Heat treat: 25–35 R″C″

The grooves were right hand spirals with 1.38″ lead with the inner groove spaced 180° from the outer groove when viewed from a horizontal cross-section. The groove dimensions were: depth=.25″; width at outer surface =⅞″; inward taper of groove=150° from perpendicular to central axis for each side of groove.

| | |
|---|---|
| Effective length _____ in__ | 11 |
| Weight _____ pounds__ | 11.5 |
| Gravitational constant _____ ft./sec.²__ | 32.2 |
| Compressional force _____ pounds__ | 20,000 |
| Change in length $\Delta l$ _____ in__ | .0076 |

The computed velocity is 8620 ft./sec.

The actual measured velocity using a 30 kc. pulse of acoustic energy was 12,100 ft./sec.

In FIG. 5 a housing 23′ is illustrated with a modified outer groove 42′ which is enlarged relative to the groove 42 shown in FIG. 3. Groove 42 is considerably wider than the inner groove 41 and rectangular in form. The depth of the grooves 41 and 42′ remain substantially the same, in that the inner and outer grooves overlap the mid-point between the inner and outer walls of the housing.

To provide illustrations of the nature of the above configuration, the following listed example is provided:

Example No. 2 (FIG. 5)

A sample metal tube was constructed having a pattern as shown in FIG. 5. This pattern involved the provisions of an outer groove with a width of 0.6″ and wherein the sides of the groove are perpendicular to the axis of the tube. Other parameters are:

| | |
|---|---|
| Helical angle $\phi$ _____ degrees__ | 72 |
| Effective length _____ in__ | 11 |
| Weight _____ pounds__ | 9.38 |
| Gravitational constant _____ ft./sec.²__ | 32.2 |
| Compressional force _____ | 20,000 |
| Change in length $\Delta l$ _____ in__ | .0077 |

The computed velocity is 9480 ft./sec.

The actual measured velocity using a 30 kc. pulse of acoustic energy is 10,800 ft. per sec.

Also shown in FIG. 5 is another form which the housing 23' may assume. Housing 23', at the end of the acoustic inhibiting section is reduced in diameter by means of a connecting stub member 35' on which the transducer 35 is mounted. It will be readily apparent that mounting of the transducers in this manner can easily be accomplished by one skilled in the art.

The effect of variations in the housing configurations of FIGS. 3 and 5 can be described as follows: as the helix angle increases (up to 90°), the apparent velocity of the housing decreases and conversely as the helix angle decreases (towards 0°), the apparent velocity of the housing increases. As the overlap of the grooves in the inner and outer walls increases, the apparent velocity decreases. The foregoing variations, of course, also directly affect the strength characteristics of the housing. The variations therefore are considered in the light of the particular application that the housing may have.

Referring now to FIG. 6, still another embodiment of the present invention is illustrated. In this embodiment a housing 50 is provided with helical corrugations or convolutions along its length which operate in a manner similar to the above described housing 23. The recesses in the inner and outer walls as formed by the convolutions overlap one another relative to an imaginary cylinder extending along the length of the housing.

From the foregoing description of the present invention it will be appreciated how to provide an acoustic logging tool with a housing so constructed to substantially eliminate uniform longitudinal paths to inhibit the immediate transmission of detectable acoustic energy therealong.

In the disclosed arrangements, the transducers are so arranged that they are exposed to well fluids. However, if desired, the housing could be enclosed or encased with a rubber or other low velocity composition to provide a fluid tight housing. In such an arrangement, the interior of the fluid tight housing would be oil-filled for sound transmission purposes.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. Apparatus for use in acoustically surveying a well bore comprising: an elongated, tubular member of steel adapted to be passed through a well bore; at least two acoustic transducers mounted in a fixed relationship relative to said tubular member, said tubular member between said transducers having spiral grooves in its inner and outer walls, said grooves having sufficient depth to interrupt a linear path and provide a tortuous acoustic path longitudinally of said tubular member.

2. Apparatus for use in acoustically surveying a well bore comprising: an elongated, tubular member of steel adapted to be passed through a well bore; at least two acoustic transducers mounted in a fixed relationship relative to said tubular member; said tubular member between said transducers having spiral grooves in its inner and outer walls, said grooves having a similar pitch, said grooves being displaced longitudinally of one another and having a sufficient depth to interrupt a linear path and provide a tortuous acoustic path longitudinally of said tubular member.

3. Apparatus for use in acoustically surveying a well bore comprising: an elongated, tubular member of steel adapted to be passed through a well bore; at least two acoustic transducers mounted in a fixed relationship relative to said tubular member; said tubular member between said transducers having spiral grooves in its inner and outer walls, said grooves having a helical angle of approximately 72°, said grooves being displaced longitudinally of one another and having a sufficient depth to interrupt a linear path and provide a tortuous acoustic path longitudinally of said tubular member.

4. Apparatus for use in acoustically surveying a well bore comprising: an elongated, tubular member of steel adapted to be passed through a well bore; at least two acoustic transducers mounted in a fixed relationship relative to said tubular member, said tubular member between said transducers having spiral grooves in its inner and outer walls with a depth greater than one-half the thickness of the wall of the tubular member.

5. Apparatus for use in acoustically surveying a well bore comprising: an elongated, tubular member of steel adapted to be passed through a well bore; at least two acoustic transducers mounted in a fixed relationship relative to said tubular member, said tubular member between said transducers having an integral, solid configuration in which the inner and outer walls of said support member are displaced radially relative to one another along the length of said tubular member to provide a tortuous acoustic path longitudinally of said tubular member.

6. Apparatus for use in acoustically surveying a well bore comprising: an elongated steel member adapted to be passed through a well bore; at least two acoustic transducers mounted in a fixed, spaced-apart relationship relative to said member, the portion of said member between said transducers being of a solid-walled, tubular configuration, having inner and outer wall surfaces each provided with undulations along its length to provide only tortuous acoustic paths lengthwise of said portion of said member which are longer than the straight-line distance between said transducers.

References Cited by the Examiner

UNITED STATES PATENTS

| | | | |
|---|---|---|---|
| 2,350,371 | 6/44 | Smith | 181—0.5 |
| 2,722,282 | 11/55 | McDonald | 181—0.5 |
| 2,757,358 | 7/56 | Ely | 340—1 |
| 2,848,672 | 8/58 | Harris | 340—11 X |
| 2,938,592 | 5/60 | Charske et al. | 181—0.5 |
| 2,993,553 | 7/61 | Howes | 181—0.5 |

SAMUEL FEINBERG, *Primary Examiner.*

CHESTER L. JUSTUS, CARL W. ROBINSON,
*Examiners.*